(12) United States Patent
Morita et al.

(10) Patent No.: US 7,122,132 B2
(45) Date of Patent: Oct. 17, 2006

(54) BRANCHED VAPOR-GROWN CARBON FIBER, ELECTRICALLY CONDUCTIVE TRANSPARENT COMPOSITION AND USE THEREOF

(75) Inventors: Toshio Morita, Kanagawa (JP); Hitoshi Inoue, Kanagawa (JP); Ryuji Yamamoto, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 234 days.

(21) Appl. No.: 10/451,080

(22) PCT Filed: Dec. 19, 2001

(86) PCT No.: PCT/JP01/11130

§ 371 (c)(1),
(2), (4) Date: Jun. 19, 2003

(87) PCT Pub. No.: WO02/49412

PCT Pub. Date: Jun. 27, 2002

(65) Prior Publication Data

US 2004/0036060 A1     Feb. 26, 2004

Related U.S. Application Data (60) Provisional application No. 60/267,176, filed on Feb. 8, 2001, provisional application No. 60/267,179, filed on Feb. 8, 2001.

(30) Foreign Application Priority Data

Dec. 20, 2000  (JP) .............................. 2000-387811
Dec. 20, 2000  (JP) .............................. 2000-387812

(51) Int. Cl.
*H01B 1/04* (2006.01)
*H01B 1/06* (2006.01)
*C01B 31/02* (2006.01)
*B32B 9/00* (2006.01)

(52) U.S. Cl. .................... 252/502; 525/503; 525/511; 428/367; 423/445 R; 423/447.5; 423/447.1

(58) Field of Classification Search ................ 252/502, 252/503, 511; 428/367, 922; 423/445 B, 423/447.5, 447.1
See application file for complete search history.

(56) References Cited

U.S. PATENT DOCUMENTS 4,572,813 A     2/1986  Arakawa (Continued)

FOREIGN PATENT DOCUMENTS

EP          0 205 556 B1     5/1995

(Continued)

OTHER PUBLICATIONS

International Search Report for PCT/JP01/11130 mailed Apr. 16, 2002.
International Preliminary Examination Report for PCT/JP01/11130 dated Mar. 26, 2003. * cited by examiner

*Primary Examiner*—Mark Kopec
*Assistant Examiner*—Kallambella Vijayakumar
(74) *Attorney, Agent, or Firm*—Sughrue Mion, PLLC (57) ABSTRACT

A branched vapor-grown carbon fiber having an outer diameter of 0.5 μm or less and an aspect ratio of at least 10, the carbon fiber having a compressed specific resistance of 0.02 Ω·cm or less, each fiber filament having a hollow cylindrical structure, preferably the carbon fiber containing boron and having a compressed specific resistance of 0.018 Ω·cm or less. An electrically conductive transparent composition comprising a resin binder and carbon fiber incorporated into the binder, having transparency and comprising vapor grown carbon fiber having an outer diameter of 0.01–0.1 μm, an aspect ratio of 10–15,000, and a compressed specific resistance of 0.02 Ω·cm or less, and surface resistivity of 10,000 Ω/□ or less. An electrically conductive transparent material formed from the aforementioned electrically conductive transparent composition.

23 Claims, 4 Drawing Sheets

U.S. PATENT DOCUMENTS

| | | | |
|---|---|---|---|
| 4,663,230 A | | 5/1987 | Tennent |
| 4,816,289 A | * | 3/1989 | Komatsu et al. ......... 423/447.3 |
| 5,413,866 A | * | 5/1995 | Baker et al. ............. 423/447.2 |
| 5,643,670 A | * | 7/1997 | Chung ........................ 428/367 |
| 5,908,585 A | * | 6/1999 | Shibuta ...................... 252/506 |
| 6,489,026 B1 | * | 12/2002 | Nishimura et al. ......... 428/367 |

FOREIGN PATENT DOCUMENTS

| | | | |
|---|---|---|---|
| EP | 0 491 728 B1 | | 3/1997 |
| JP | 57-117623 | | 7/1982 |
| JP | 60-27700 | | 2/1985 |
| JP | 61-70014 | | 4/1986 |
| JP | 6-39576 | | 9/1986 |
| JP | 6-316816 | | 11/1994 |
| JP | 7-102197 | | 4/1995 |
| JP | 07-150419 | * | 6/1995 |
| JP | 7-150419 | | 6/1995 |
| JP | 7-172807 A | | 7/1995 |
| JP | 2778434 | | 5/1998 |
| JP | 2000-173347 | | 6/2000 |

* cited by examiner

BRANCHED VAPOR-GROWN CARBON FIBER, ELECTRICALLY CONDUCTIVE TRANSPARENT COMPOSITION AND USE THEREOF

CROSS-REFERENCE TO RELATED APPLICATIONS

The present application is an application filed pursuant to Section 111 (a) with a claim to priority to Provisional Application Ser. Nos. 60/267,176 and 60/267,179 filed Feb. 8, 2001 pursuant to 35 U.S.C. Section 119(e) (1) in accordance with 35 U.S.C. 111(b).

TECHNICAL FIELD

The present invention relates to vapor grown carbon fiber exhibiting an enhanced function when used as an electrically conductive or heat conductive filler for composite materials, such as resin- or rubber-based composite materials or an enhanced function when used as an additive which may be incorporated into the electrodes of various batteries, such as lead storage batteries and to a process for producing it. The present invention also relates to an electrically conductive transparent composition containing a resin and carbon fiber incorporated into the resin, which composition does not lose transparency inherent to the resin and exhibits both electrical conductivity and transparency. The electrically conductive transparent composition of the present invention is useful as an electrically conductive transparent material in a variety of materials requiring light transmission and electrical conductivity, for example, electrically conductive transparent coating, electrically conductive transparent film, or electrically conductive transparent sheet.

BACKGROUND ART

In general, electrically conductive coating, film, or sheet is produced from a mixture containing electrically conductive material and paint or film material. Widely used electrically conductive materials include metallic powder, electrically conductive inorganic oxide powder, and carbon powder. However, metallic powder has a drawback in that the electrical conductivity of the powder is lowered through oxidation or corrosion. Furthermore, when a noble metal (e.g., silver), which does not easily undergo oxidation or corrosion, is used for, for example, wires of an IC, etc., the noble metal involves problems, including short circuit due to migration. Although carbon powder does not have such a drawback of metallic powder, the electrical conductivity of carbon powder is lower than that of metallic powder. Therefore, in order to enhance electrical conductivity, there have been proposed, for example, carbon fiber which is easily graphitized and has a specific structure in which an aspect ratio is large (Japanese Patent Publication (kokoku) No. 06-39576), or a material containing entangled carbon fiber filaments (Japanese Patent Application Laid-Open (kokai) No. 07-102197).

However, in the case where the aforementioned electrically conductive material is incorporated into a resin, a problem arises that transparency inherent to the resin may be lost when the incorporation amount of the conductive material is increased in order to enhance the electrical conductivity of the resin. For example, when a material containing entangled carbon fiber filaments is incorporated into a resin, the incorporation amount of the material must be tens of mass % in order to secure sufficient enhancement of the electrical conductivity of the resin. As a result, when the thickness of a coating or a film formed from the resin is about 1 mm, the transmittance of the coating or film becomes about 30%; i.e., the coating or film becomes opaque and barely transmits light. In contrast, when the amount of carbon fiber incorporated into a resin is reduced in order to maintain the transparency of the resin, the electrical conductivity of a coating or film formed from the resin is greatly reduced.

There has also been proposed an electrically conductive transparent composition prepared from an electrically conductive material to which, in order to enhance electrical conductivity, a mixture of graphite having an average particle size of 1–20 μm and carbon powder having a BET specific surface area of 25–800 $m^2$/g has been incorporated (Japanese Patent Application Laid-Open (kokai) No. 2000-173347). However, when the composition is formed to have a thickness of 0.02–0.5 μm and a transmittance of 30%, the surface resistivity of the composition is $1 \times 10^5$ Ω/□ (ohm/square)(or simply referred to Ω, hereinafter the same will do); i.e., the electrical conductivity of the composition is still low. As described above, conventional electrically conductive coating or electrically conductive film encounters difficulty in attaining both transparency and high electrical conductivity.

An object of the present invention is to overcome the aforementioned problems of conventional electrically conductive coating or electrically conductive film and to provide an electrically conductive transparent composition comprising carbon fiber, in particular vapor grown carbon fiber (hereinafter sometimes abbreviated as "VGCF"), of very small outer diameter and high electrical conductivity, which composition does not lose transparency inherent to a resin and exhibits both transparency and high electrical conductivity; and an electrically conductive transparent material formed from the composition.

Vapor grown carbon fiber (VGCF) is produced by thermally decomposing a raw material gas, such as hydrocarbon gas, in a vapor phase in the presence of a metallic catalyst, and by growing the decomposition product into a fibrous shape. It has been known that carbon fiber having a diameter of tens of nm to 1,000 nm can be produced through this process.

A variety of processes for producing VGCF are disclosed, including a process in which an organic compound such as benzene, serving as a raw material, and an organic transition metal compound such as ferrocene, serving as a catalyst, are introduced into a high-temperature reaction furnace together with a carrier gas, to thereby produce VGCF on a substrate (Japanese Patent Application Laid-Open (kokai) No. 60-27700); a process in which VGCF is produced in a dispersed state (Japanese Patent Application Laid-Open (kokai) No. 60-54998 (U.S. Pat. No. 4,572,813)); and a process in which VGCF is grown on a reaction furnace wall by means of spraying onto the furnace wall droplets of a solution containing a raw material and a metallic catalyst (Japanese Patent No. 2778434).

The aforementioned processes have enabled production of carbon fiber of relatively small outer diameter and high aspect ratio which exhibits excellent electrical conductivity and heat conductivity and is suitable as a filler material. For example, carbon fiber having an outer diameter of about 10 to about 200 nm and an aspect ratio of about 10 to about 500 has been mass-produced and used, for example, as an electrically conductive or heat conductive filler material to be incorporated into electrically conductive resin, or as an additive to be incorporated into lead storage batteries.

A characteristic feature of a VGCF filament resides in its shape and crystal structure. A VGCF filament has a multi-layered shell structure having a very thin central hollow portion, wherein a plurality of carbon hexagonal network layers are grown around the hollow portion so as to form annual rings.

A carbon nano-tube, which is a type of carbon fiber having a diameter smaller than that of VGCF, has been discovered in soot obtained by evaporating a carbon electrode through arc discharge in helium gas. The carbon nano-tube has a diameter of 1–30 nm, and has a structure similar to that of a VGCF filament; i.e., the tube has a hollow cylindrical structure having a central hollow portion, wherein a plurality of carbon hexagonal network layers are grown around the hollow portion so as to form annual rings. However, the process for producing the nano-tube through arc discharge is not carried out in practice, since the process is not suitable for mass production.

Meanwhile, carbon fiber of high aspect ratio and high conductivity can be produced through the vapor-growth process, and therefore various improvements to the carbon fiber have been made. For example, U.S. Pat. No. 4,663,230 and Japanese Patent Publication (kokoku) No. 3-64606 (European Patent No. 205556) disclose a graphitic cylindrical carbon fibril having an outer diameter of about 3.5 to about 70 nm and an aspect ratio of at least 100. The carbon fibril has a structure such that a plurality of layers of ordered carbon atoms are continuously disposed concentrically around the longitudinal axis of the fibril, and the C-axis of each of the layers is substantially perpendicular to the longitudinal axis. The entirety of the fibril has a smooth surface, and includes no thermal carbon overcoat deposited through thermal decomposition. Japanese Patent Application Laid-Open (kokai) No. 61-70014 discloses vapor grown carbon fiber having an outer diameter of 10–500 nm and an aspect ratio of 2–30,000, the thermal decomposition carbon layer of the carbon fiber having a thickness of 20% or less the diameter of the carbon fiber. However, detailed studies have not yet been performed on the branched hollow structure, compressed specific resistance, and heat conductivity of the aforementioned carbon fibers.

Carbon fiber has low contact resistance, and, as compared with conventional carbon black or similar material, exhibits excellent electrical conductivity and heat conductivity, and has high strength, since, in carbon fiber, carbon structure is developed along a longitudinal direction of a fiber filament, and fiber filaments are entangled extensively with one another. Therefore, various attempts have been made to enhance such characteristics of carbon fiber. For example, Japanese Patent No. 2862578 (European Patent No.491728) discloses that the contact resistance of carbon fiber is reduced by incorporating, into a resin composition, carbon fiber containing entangled fiber filaments. Japanese Patent No. 1327970 discloses branched VGCF in which fresh VGCF is grown on a VGCF substrate. Japanese Patent Application Laid-Open (kokai) No. 6-316816 discloses VGCF having gnarled depositions thereon.

The aforementioned attempts have been made in order to ensure contact between fine carbon fiber filaments in a composite material, by bringing the filaments into contact with one another or by bonding the filaments with one another in advance. In addition to such carbon fiber filaments, there has been a demand for a single carbon fiber filament of enhanced electrical conductivity or heat conductivity.

DISCLOSURE OF THE INVENTION

The present inventors have improved the structure of VGCF, and have obtained branched vapor-grown carbon fiber having a very small outer diameter, each fiber filament having a hollow cylindrical structure such that a central hollow portion extends throughout the filament including a branched portion thereof; i.e., branched vapor-grown carbon fiber of very small outer diameter exhibiting excellent electrical conductivity and heat conductivity. The branched vapor-grown carbon fiber has a very small outer diameter, each fiber filament having a hollow cylindrical structure such that a central hollow portion extends throughout the filament including a branched portion thereof, the carbon fiber having high electrical conductivity and heat conductivity. When the carbon fiber is added to a material such as resin or rubber or to electrodes of various batteries, the carbon fiber filaments are dispersed so as to form a network structure, to thereby enhance electrical conductivity and heat conductivity of such a material.

That is, the present invention provides a branched vapor-grown carbon fiber, a process for producing it, an electrically conductive transparent composition and an electrically conductive transparent material formed therefrom having the following constituent features.

1. Branched vapor-grown carbon fiber having an outer diameter of 0.5 µm or less and an aspect ratio of at least 10, each fiber filament having a hollow cylindrical structure, characterized by having a compressed specific resistance of 0.02 Ω·cm or less;
2. Branched vapor-grown carbon fiber according to 1 above, which has an outer diameter of 0.05–0.5 µm, a length of 1–100 µm, and an aspect ratio of 10–2,000;
3. Branched vapor-grown carbon fiber according to 1 above, which has an outer diameter of 0.002–0.05 µm, a length of 0.5–50 µm, and an aspect ratio of 10–25,000;
4. Branched vapor-grown carbon fiber according to 2 or 3 above, which has a compressed specific resistance of 0.018 Ω·cm or less, each fiber filament having a structure such that a central hollow portion extends throughout the filament including a branched portion thereof;
5. Branched vapor-grown carbon fiber according to 4 above, which comprises, in an amount of at least 10 mass %, branched carbon fiber, each fiber filament having a structure such that a central hollow portion extends throughout the filament including a branched portion thereof;
6. Branched vapor-grown carbon fiber according to 1 above, which further comprises boron;
7. Branched vapor-grown carbon fiber according to 6 above, which comprises boron in an amount of 0.01–5 mass %;
8. Branched vapor-grown carbon fiber according to any one of 1 to 7 above, which has a heat conductivity of at least 100 kcal(mh° C.)$^{-1}$;
9. Branched vapor-grown carbon fiber according to 8 above, which has a heat conductivity of at least 100 kcal(mh° C.)$^{-1}$ when the fiber is compressed so as to attain a bulk density of 0.8 g/cm$^3$;
10. A process for producing branched vapor grown carbon fiber according to 1 above, by thermal decomposition of an organic compound with a transition metal catalyst, characterized by spraying droplets of organic compound containing 5–10 mass % of a transition metal element or its compound on a heating furnace wall to allow reaction to form carbon fiber filaments on the furnace wall, burning the recovered filaments at 800–1,500° C. in a non-oxidative atmosphere, and heating them at 2,000–3,000° C. to perform graphitization treatment in a non-oxidative atmosphere;

11. A process according to 10 above, wherein the heating for graphitization treatment is performed after doping with boron or at least one boron compound selected from the group consisting of boron oxide, boron carbide, boric ester, boric acid or its salt, and organic boron compounds as a crystallization promotion compound in an amount of 0.1–5 mass % in terms of boron;

12. An electrically conductive transparent composition comprising a resin binder and carbon fiber incorporated into the binder, characterized by having transparency and comprising vapor grown carbon fiber having an outer diameter of 0.01–0.1 μm, an aspect ratio of 10–15,000, and a compressed specific resistance of 0.02 Ω·cm or less;

13. An electrically conductive transparent composition according to 12 above, wherein the carbon fiber is vapor grown carbon fiber having an outer diameter of 0.05–0.1 μm or less, a length of 1–100 μm, and an aspect ratio of 10–2,000, each fiber filament having a hollow cylindrical structure;

14. An electrically conductive transparent composition according to 12 above, wherein the blending amount of vapor grown carbon fiber is 5–40 mass % of the total composition;

15. An electrically conductive transparent composition according to 12 above, which has a surface resistivity of 10,000 Ω/□ or less;

16. An electrically conductive transparent composition according to 12 above, which has a surface resistivity of 5–10,000 Ω/□, and a transmittance of at least 60% when the composition is formed to have a thickness of 0.5 μm;

17. An electrically conductive transparent composition according to 12 or 13 above, wherein the carbon fiber is vapor grown carbon fiber having an interlayer distance ($d_{002}$) of carbon crystal layers of 0.339 nm or less and a compressed specific resistance of 0.018 Ω·cm or less;

18. An electrically conductive transparent composition according to 13 above, wherein the branched vapor grown carbon fiber has a compressed specific resistance of 0.018 Ω·cm or less, each fiber filament thereof having a structure such that a central hollow portion extends throughout the filament including a branched portion thereof;

19. An electrically conductive transparent composition according to 18 above, wherein the carbon fiber comprises, in an amount of at least 10 mass %, branched vapor-grown carbon fiber, each fiber filament having a structure in which a central hollow portion extends throughout the filament including a branched portion thereof;

20. An electrically conductive transparent composition according to 12 or 13 above, wherein the vapor grown carbon fiber comprises boron or a combination of boron and nitrogen in an amount of 0.01–3 mass %;

21. An electrically conductive transparent composition according to 12 or 13 above, wherein the vapor grown carbon fiber comprises fluorine in an amount of 0.001–0.05 mass %;

22. An electrically conductive transparent composition according to 12 or 13 above, wherein the vapor grown carbon fiber is coated with 20–70 mass % aluminum oxide;

23. An electrically conductive transparent composition according to 12 or 13 above, which comprises carbon black together with the vapor grown carbon fiber;

24. An electrically conductive transparent material formed from an electrically conductive transparent composition as recited in any one of 12 through 23 above; and 25. An electrically conductive transparent material according to 24 above, which assumes a form of coating, film produced through spraying, film, or sheet.

DETAILED DESCRIPTION OF THE INVENTION

First of all, the branched vapor-grown carbon fiber of the present invention will be explained.

The present invention provides a branched carbon fiber produced through the vapor-growth process, which has an outer diameter of 0.5 μm or less, an aspect ratio of at least 10, and a compressed specific resistance of 0.02 Ω·cm or less, each fiber filament having a hollow cylindrical structure. Preferably, the branched vapor-grown carbon fiber has a compressed specific resistance of 0.018 Ω·cm or less, each fiber filament having a structure such that a central hollow portion extends throughout the filament including a branched portion thereof.

Figure 1:
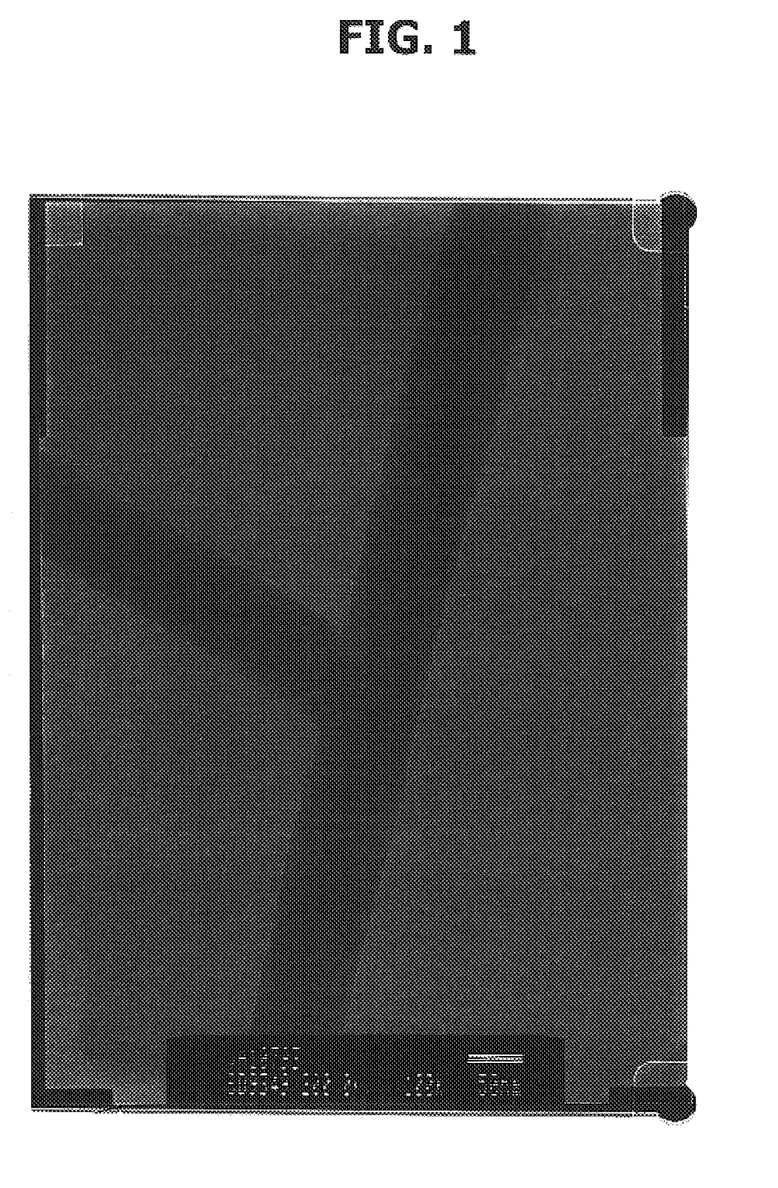
FIG. 1 shows a photomicrograph of the branched vapor-grown carbon fiber of the present invention as obtained by use of a transmission electron microscope (magnification: ×100,000).
Figure 2:
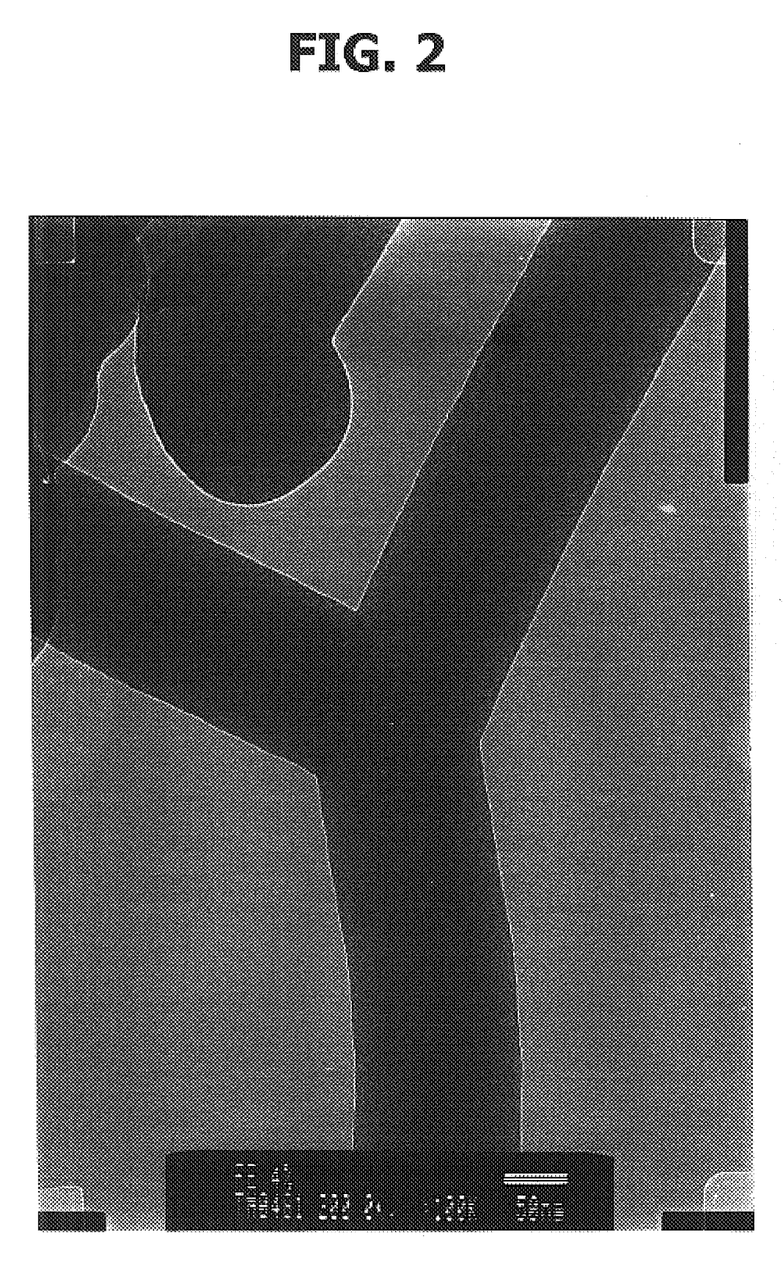
FIG. 2 shows a photomicrograph of a branched portion of the branched vapor-grown carbon fiber of the present invention (magnification: ×100,000).

As shown in photomicrographs of FIGS. 1 and 2 (magnification: ×100,000), in preferred branched vapor-grown carbon fiber of the present invention, each fiber filament has a structure such that a central hollow portion extends throughout the filament including a branched portion thereof. As a result, the sheath-forming carbon layers of the carbon fiber assume uninterrupted layers so that although the filaments of the carbon fiber have a very small diameter, the carbon fiber exhibits excellent electrical conductivity and heat conductivity. The electrical conductivity and heat conductivity of a conventional carbon fiber vary with the degree of contact or adhesion between the fiber filaments. Since branched portions of the conventional carbon fiber are bonded with one another so as to form nodules as shown in, for example, the photomicrograph of FIG. 3 (magnification: ×100,000), the electrical conductivity and heat conductivity of the conventional carbon fiber are lower than those of the carbon fiber of the present invention.

As used herein, the term "hollow cylindrical structure" of the branched vapor-grown carbon fiber refers to a structure such that a plurality of carbon layers form a sheath. The hollow cylindrical structure encompasses a structure such that sheath-forming carbon layers form an incomplete carbon sheet; a structure such that the carbon layers are partially broken; and a structure such that the laminated two carbon layers are formed into a single carbon layer. The cross section of the sheath does not necessarily assume a round shape, and may assume an elliptical shape or a polygonal shape. No particular limitation is imposed on the interlayer distance ($d_{002}$) of carbon crystal layers. The interlayer distance ($d_{002}$) of the carbon layers as measured through X-ray diffraction is preferably 0.339 nm or less, more preferably 0.338 nm or less. The thickness (Lc) of the carbon crystal layer in the c axis direction is preferably 40 nm or less.

The branched vapor-grown carbon fiber of the present invention has a very small diameter; i.e., an outer diameter of 0.5 µm or less, and an aspect ratio of at least 10. Preferably, the carbon fiber has an outer diameter of 0.05–0.5 µm and a length of 1–100 µm (i.e., an aspect ratio of 10–2,000); or an outer diameter of 0.002–0.05 µm and a length of 0.5–50 µm (i.e., an aspect ratio of 10–25,000). When the outer diameter of the carbon fiber exceeds 0.5 µm, mixing of the carbon fiber in the resin is difficult, which is not preferable. In contrast, when the outer diameter of the carbon fiber is less than 0.002 µm, the strength of the carbon fiber is lowered, allowing the fiber to break easily, which is not preferable.

Although carbon fiber having an outer diameter of 0.05–0.5 µm and a length of 1–100 µm can be produced through the process for producing branched vapor-grown carbon fiber (Japanese Patent No. 2778434) in which droplets of a solution including a raw material and a metallic catalyst are sprayed onto a reaction furnace wall, the carbon fiber of the present invention has an outer diameter smaller than that of the above carbon fiber by one digit; i.e., an outer diameter of 0.01–0.1 µm. Such a very thin carbon fiber can be produced by utilizing the catalytic action of a crystallization promotion element, preferably boron, etc.; i.e., by doping (adding a small amount of) this element to carbon crystals, during graphitization of deposited carbon fiber. The doping amount of the element in terms of boron is suitably 0.01 to 5 mass %, preferably 0.1 to 3 mass %. When the amount of boron exceeds 5 mass %, doping with boron is difficult, whereas when the amount of boron is less than 0.01 mass %, the effect of boron is not satisfactory. When boron is incorporated into carbon crystals, the interlayer distance ($d_{002}$) of carbon layers is reduced, allowing crystallization to proceed.

The branched vapor-grown carbon fiber of the present invention has a compressed specific resistance when the fiber is compressed so as to attain a bulk density of 0.8 g/cm$^3$ (hereinafter the resistance will be simply referred to as "compressed specific resistance") of 0.02 Ω·cm or less, preferably 0.018 Ω·cm or less. As described below in Examples, carbon fiber including branched fiber, which is produced through the conventional vapor-growth process, has a compressed specific resistance of about 0.021 Ω·cm. When such a conventional carbon fiber is mixed with a resin to thereby prepare a conductive paste, the volume resistance of the paste is on the order of 0.38–0.45 Ω·cm. In contrast, as shown in Examples, the carbon fiber including branched fiber of the present invention has an electrical conductivity higher than that of the conventional carbon fiber, and has a compressed specific resistance of 0.005–0.018 Ω·cm.

The branched vapor-grown carbon fiber of the present invention has a heat conductivity of at least 100 kcal(mh° C.)$^{-1}$, or a heat conductivity when the fiber is compressed so as to attain a bulk density of 0.8 g/cm$^3$ of at least 100 kcal(mh° C.)$^{-1}$. Since the carbon fiber has a branched shape and enhanced crystallinity, when the fiber is mixed with a resin, the heat conductivity of the resultant composite material can be enhanced. In order to obtain the effect of the branched vapor-grown carbon fiber, the carbon fiber is preferably incorporated into a resin in an amount of at least 10 mass %. Heat conductivity correlates to electrical conductivity; i.e., when electrical conductivity is high, heat conductivity is also high.

The aforementioned branched vapor-grown carbon fiber of the present invention can be used, in a variety of fields, as a material for resin filler for use in magnetic wave shielding materials and antistatic materials, conductive ink, a conductive paste, a transparent electrode, electrode additive, conductivity imparting agent for photoconductor drums, optical material, high-strength-structure material, and heat conductive material.

The process for producing the branched vapor-grown carbon fiber of the present invention will next be described.

Branched vapor grown carbon fiber of the present invention can be produced according to the process for producing vapor-grown carbon fiber (Japanese Patent No. 2778434) in which droplets of a solution including a raw material and a metallic catalyst are sprayed onto a reaction furnace wall.

First, crude fine carbon fiber filaments are obtained by thermal decomposition of an organic compound, in particular a hydrocarbon, by use of an organic transition metal compound serving as a catalyst.

The organic transition metal compound as used herein includes organic compounds that contain metals belonging to the Group IVa, Va, VIa, VIIa and VIII in the periodic table. Among them, those compounds such as ferrocene and nickelocene are preferred.

In order to increase the content of branched carbon fiber, the concentration of a metallic catalyst such as ferrocene, which is added to a raw material, is preferably increased. Conventionally, the concentration of the metallic catalyst is about 4 mass %, but in the present invention the concentration of the metallic catalyst is preferably 5–10 mass %, more preferably about 7 mass %.

In addition, a sulfur compound may be used as a promoter. The form of the sulfur compound is not particularly limited as far as it is dissolved in an organic compound as a carbon source. The sulfur compound that can be used includes thiophene, various types of thiols, inorganic sulfur and so forth. The use amount thereof is suitably 0.01–10.0 mass %, preferably 0.03–5.0 mass %, more preferably 0.1–4.0 mass %.

The organic compound that can be used as a raw material for the carbon fiber includes organic compounds such as benzene, toluene, xylene, methanol, ethanol, naphthalene, phenanthrene, cyclopropane, cyclopentane and cyclohexane; volatile oils; kerosene; or gases such as CO, natural gas, methane, ethane, ethylene and acetylene, and mixtures thereof. Among then, aromatic compounds such as benzene, toluene and xylene are particularly preferred.

Usually, hydrogen gas and other reducing gases are used as a carrier gas. It is preferred that the carrier gas be preliminarily heated at 500–1,300° C. The reason for heating is that both generation of a catalyst metal and supply of a carbon source through thermal decomposition of the carbon compound can take place simultaneously so that the reaction can complete instantaneously to obtain a finer carbon fiber. When the carrier gas is mixed with the raw material, the thermal decomposition of the carbon compound as a raw material can barely occur if the temperature for heating the carrier gas is below 500° C. while if such heating temperature exceeds 1,300° C., the carbon fiber grows in the radial direction, so that the diameter tends to become larger.

The use amount of carrier gas is suitably 1–70 mol per mol of the carbon source (organic compound). The diameter of the carbon fiber can be controlled by varying the ratio of the carbon source to the carrier gas.

The raw material is prepared by dissolving a transition metal compound and a sulfur compound as a promoter in an organic compound as a carbon source.

There has been conventionally known a process for producing branched carbon fiber in which a raw material and a metallic catalyst are gasified, and fed to a reaction furnace. However, this conventional process can barely generate branched carbon fiber. Accordingly, in the present invention it is preferred that a solution including an organic compound raw material such as benzene and a metallic catalyst such as ferrocene be sprayed and fed in the form of a liquid into the reaction furnace or a portion of the carrier gas be used as a purge gas to gasify the solution before it can be fed into the reaction furnace. In order to obtain carbon fiber having a smaller diameter, it is preferably that a gas obtained by gasifying the solution is fed into the reaction furnace. When the solution is sprayed in the form of a liquid onto a reaction furnace wall to thereby allow reaction to proceed, the concentration of the raw material and the metallic catalyst increases locally, and thus branched carbon fiber is easily deposited. Through recovery and crystallization of the thus-deposited carbon fiber, there can be produced branched vapor-grown carbon fiber containing, in an amount of at least 10 mass %, branched carbon fiber filaments having a structure in which central hollow portions extend throughout the filaments including branched portions thereof.

As the reaction furnace, usually a vertical type electric furnace is used. The temperature of reaction furnace is 800–1,300° C., preferably 1,000–1,300° C. By feeding the raw material solution and the carrier gas, or the raw material gas obtained by gasifying the raw material and the carrier gas to the reaction furnace the temperature of which has been elevated to a predetermined temperature to allow them to react with each other to obtain carbon fiber.

After the carbon fiber containing branched carbon fiber filaments produced in the reaction furnace is recovered, the carbon fiber is heated and fired at 800–1,500° C. in a non-oxidizing atmosphere such as argon gas, to thereby allow crystallization to proceed. Subsequently, the thus-crystallized carbon fiber is further heated at 2,000–3,000° C. in a non-oxidizing atmosphere, to thereby allow graphitization to proceed. During this graphitization, the crystallized carbon fiber is doped with a crystallization promotion element (by addition of a small amount of it), to thereby enhance crystallinity of the fiber. The crystallization promotion element is preferably boron. Since the graphitized fine carbon fiber is covered with a dense basal plane (a plane of hexagonal network structure), preferably, carbon fiber of low crystallinity, which has been heated at 1,500° C. or lower is doped with boron. In this case, also carbon fiber of high crystallinity can be obtained since the carbon fiber of low crystallinity is heated to its graphitization temperature when it is doped with boron; i.e., when it is subjected to boronization.

The doping amount of boron is typically 5 mass % or less with respect to the amount of carbon. When carbon fiber is doped with boron in an amount of 0.1–5 mass % in terms of boron, the crystallinity of the carbon fiber can be effectively enhanced. Therefore, elementary boron or a boron compound (e.g., boron oxide ($B_2O_3$), boron carbide ($B_4C$), a boric ester, boric acid ($H_3BO_3$) or a salt thereof, or an organic boron compound) as a crystallization promotion compound is added to carbon fiber such that the boron content of the carbon fiber falls within the above range. In consideration of percent conversion, the boron compound may be added in an amount of 0.1–5 mass % in terms of boron with respect to the amount of carbon. It should be noted, however, that only requirement is that boron be present when the fiber is crystallized through heat treatment. Boron may be evaporated during the course of high-temperature treatment performed after carbon fiber has been highly crystallized, to thereby reduce the boron content of the carbon fiber relative to the amount of boron initially added to the fiber. However, such a reduction is acceptable only to such an extent that the amount of residual boron in the fiber after the treatment is about 0.01 mass % or more.

The temperature required for introducing boron into carbon crystals or the surface of carbon fiber is at least 2,000° C., preferably at least 2,300° C. When the heating temperature is lower than 2,000° C., introduction of boron becomes difficult, because of low reactivity between boron and carbon. In order to enhance crystallinity of carbon fiber, and to make the interlayer distance ($d_{002}$) of carbon crystal layers 0.338 nm or less, the heating temperature is preferably maintained at 2,300° C. or higher. The heat treatment is carried out in a non-oxidizing atmosphere, preferably in an atmosphere of rare gas such as argon. When the heat treatment is carried out for a very long period of time, sintering of carbon fiber proceeds, resulting in a low yield. Therefore, after the temperature of the center portion of carbon fiber reaches the target temperature, the carbon fiber is maintained at the target temperature within about one hour.

Carbon fiber produced through the vapor-growth process has a very small bulk density. Therefore, preferably, after the carbon fiber is uniformly mixed with boron or a boron compound, the resultant mixture is subjected to shaping, granulation, or compression, and the resultant carbon fiber of high density is heated. When carbon fiber of high density is subjected to heat treatment, a portion of the fiber is sintered to become flocky. Therefore, after the flocky portion is pulverized, the carbon fiber is used in a variety of materials.

Next, electrically conductive transparent composition of the present invention will be explained.

The electrically conductive transparent composition of the present invention contains a binder formed from a resin, particularly a transparent resin, and carbon fiber incorporated into the binder. A characteristic feature of the composition resides in that the composition contains vapor grown carbon fiber having an outer diameter of 0.01–0.1 μm, an aspect ratio of 10–15,000, and a compressed specific resistance of 0.02 Ω·cm or less, and that the composition has a surface resistivity of 10,000 Ω/□ or less. The composition of the present invention has both transparency and high electrical conductivity and is used as a transparent electrode for coating, film produced through spraying, film, or sheet.

The carbon fiber used in the electrically conductive transparent composition of the present invention is produced through the vapor-growth process. As aforementioned, vapor grown carbon fiber (VGCF) is produced by thermally decomposing a raw material gas, such as hydrocarbon gas, in a vapor phase in the presence of a metallic catalyst, and by growing the decomposition product into a fibrous shape. A variety of processes for producing VGCF are disclosed, including a process in which an organic compound such as benzene, serving as a raw material, and an organic transition metal compound such as ferrocene, serving as a catalyst, are introduced into a high-temperature reaction furnace together with a carrier gas, to thereby produce VGCF on a substrate (Japanese Patent Application Laid-Open (kokai) No. 60-27700); a process in which VGCF is produced in a dispersed state (Japanese Patent Application Laid-Open (kokai) No. 60-54998); and a process in which VGCF is grown on a reaction furnace wall by means of spraying onto the furnace wall droplets of a solution containing a raw material and a metallic catalyst (Japanese Patent No. 2778434). The aforementioned processes have enabled production of, for example, VGCF having an outer diameter of about 0.01 to about 0.5 μm and an aspect ratio of about 10 to about 500.

In the present invention, the carbon fiber used is vapor grown carbon fiber having an outer diameter of 0.01–0.1 μm and an aspect ratio of 10–15,000. When carbon fiber having an outer diameter of more than 0.1 μm is incorporated into a resin, the transparency of the resin is greatly lowered. In contrast, when the outer diameter of carbon fiber is less than 0.01 μm, the strength of the carbon fiber is reduced, and thus when the carbon fiber is incorporated into a resin, the fiber is easily broken. Meanwhile, when the aspect ratio of carbon fiber is more than 15,000; i.e., when carbon fiber is very long, fiber filaments are excessively entangled and as a result uniform dispersion of the carbon fiber in a resin becomes difficult.

Carbon fiber having an outer diameter of 0.05–0.5 μm and a length of 1–100 μm can be produced through the process for producing vapor-grown carbon fiber (Japanese Patent No. 2778434) in which droplets of a solution including a raw material and a metallic catalyst are sprayed onto a reaction furnace wall. However, the electrically conductive transparent composition of the present invention employs carbon fiber having an outer diameter of 0.01–0.1 μm. In order to obtain a very fine carbon fiber having further improved crystallinity, the deposited carbon fiber may be graphitized. In this case, utilizing the catalytic action of a crystallization promotion element, e.g., boron or a combination of boron and nitrogen; i.e., by doping carbon crystals or the surface of carbon fiber with such an element, graphitized carbon fiber can be obtained. The doping amount of such an element is 0.01–5 mass %, preferably 0.1–3 mass %, more preferably 0.2–2.0 mass %. When the amount of such an element exceeds 5 mass %, doping with the element is difficult, whereas when the amount of the element is less than 0.01 mass %, the effect of the element is not satisfactory. When such an element as boron is incorporated into carbon crystals, the interlayer distance ($d_{002}$) of carbon layers is reduced, allowing crystallization to proceed. As a result, there can be produced carbon fiber having, as compared with conventional carbon fiber, a small outer diameter, high electrical conductivity, and high dispersibility to a resin.

The vapor grown carbon fiber used in the electrically conductive transparent composition of the present invention has a compressed specific resistance of 0.02 Ω·cm or less, preferably 0.018 Ω·cm or less, more preferably 0.015 Ω·cm or less. Incidentally, the carbon fiber produced through the conventional vapor-growth process has a compressed specific resistance of about 0.021 Ω·cm. In contrast, the carbon fiber used in the present invention has an electrical conductivity higher than that of the conventional carbon fiber, and has a compressed specific resistance of, for example, 0.005–0.018 Ω·cm. When carbon fiber having a compressed specific resistance of more than 0.02 Ω·cm is used, obtaining a transparent composition having a surface resistivity of 10,000 Ω/□, or less is difficult.

The vapor grown carbon fiber preferably used in the electrically conductive transparent composition of the present invention is branched vapor grown branched carbon fiber as described above that contains a large amount of branched carbon fiber, each fiber filament having a structure such that a central hollow portion extends throughout the filament including a branched portion thereof. In such a vapor-grown, branched carbon fiber filament having a hollow cylindrical structure, sheath-forming carbon layers assume uninterrupted layers. Therefore, although having a very small diameter, the branched carbon fiber exhibits excellent electrical conductivity and heat conductivity. The electrical conductivity and heat conductivity of conventional carbon fiber vary with the degree of contact or adhesion between fiber filaments. Since branched portions of the conventional carbon fiber are bonded with one another so as to form nodules, the electrical conductivity and heat conductivity of the conventional carbon fiber are low as compared with the present branched carbon fiber, each fiber filament having a structure such that a central hollow portion extends throughout the filament including a branched portion thereof.

The vapor grown carbon fiber used in the electrically conductive transparent composition of the present invention may be treated with fluorine so as to contain 0.001–0.05 mass % fluorine. The fluorine treatment is performed, for example, by performing contact treatment at 0–200° C. in the presence of a fluorine containing gas ($F_2$, HF, etc) or by plasma treatment with a fluorinated lower hydrocarbon such as $CF_4$ (for example, Japanese Patent Application Laid-open (Kokai) No. 8-31404). When the carbon fiber is treated with fluorine, the repellency of the surface of the carbon fiber is enhanced. As a result, carbon fiber filaments are not easily flocculated, and dispersibility of the carbon fiber can be enhanced. When the fluorine content is less than 0.001 mass %, the effect of fluorine treatment is unsatisfactory, whereas when the fluorine content exceeds 0.05 mass %, carbon crystal planes are broken, and the surface of the carbon fiber becomes rough.

The vapor grown carbon fiber used in the present invention may be treated with an aluminum compound (e.g., alumina gel, aluminum chloride, aluminum sulfate, aluminum nitrate, aluminum silicate, an aluminate, an aluminic ester, or aluminum hydroxide), preferably with alumina gel, aluminum silicate, an aluminate, or aluminum hydroxide, and may be coated with 20–70 mass % aluminum oxide. For example, an alumina film may be formed on the surface of fiber by activating the vapor grown carbon fiber with carbon dioxide to form activated carbon fiber, dipping it in about 10% sulfuric acid and washing with water, adding the fiber in an aluminum compound solution.

When the carbon fiber is subjected to such surface treatment, the hydrophilicity of the surface of the carbon fiber can be enhanced. As a result, adhesion between the carbon fiber and a resin is enhanced, and the dispersibility of the carbon fiber is enhanced. When the coating amount is less than 20 mass %, the effect of coating is unsatisfactory, whereas when the coating amount exceeds 70 mass %, adhesion between carbon fiber filaments is increased.

In the electrically conductive transparent composition of present invention, a suitable incorporation amount of vapor grown carbon fiber is appropriately 5–40 mass %, preferably 5–20 mass %, on the basis of the entirety of the composition. When the incorporation amount falls within the above range, the composition has high transparency and high electrical conductivity. Specifically, the composition has a surface resistivity of 10,000 Ω/□ or less, and can attain a transmittance of 70% or more when the composition is formed to have a thickness of 0.5 μm. In this connection, conventional electrically conductive coatings to which carbon black as a sole carbonaceous material is incorporated in an amount nearly equal to that of the corresponding carbonaceous material incorporated into the present composition have a transmittance of 30% or less; i.e., light-penetrability of the coatings is very low; whereas, when the amount of carbon black incorporated into such conventional coatings is reduced such that the light-penetrability of the coatings is maintained at a level comparable to that of a coating formed from the present composition, the surface resistivity of the conventional coatings becomes 20,000 Ω/□ or more; i.e., the electrical conductivity of the coatings is greatly reduced.

BEST MODE FOR CARRYING OUT THE INVENTION

Hereinafter, the present invention will be illustrated by way of examples and comparative examples. However, the present invention should not be construed as being limited by the following description.

In the following examples, branched fiber content (area %), boron content, bulk density (tapping density) (g/cm$^3$), compressed specific resistance (Ω·cm), specific resistance of paste (Ω·cm), surface resistivity of coating (Ω/□), transmittance (%) were measured by the following processes.

1) Branched Fiber Content (Mass %):

In a photograph showing cross section of carbon fiber by use of transmission electron microscope (TEM), a ratio of the cross sectional area of branched carbon fiber filaments to the total cross sectional area of carbon fiber filaments was obtained and assuming that the specific density is 1, the ratio was defined as mass %.

2) Boron Content:

Powder sample of carbon fiber to which calcium carbonate was added was incinerated at 800° C. in an oxygen flow. Then, after adding calcium carbonate, the obtained ash was heat-molten and the melt was dissolved in water. The resultant aqueous solution was subjected to quantitative analysis by use of inductively coupled plasma (ICP) emission spectral analysis.

3) Bulk Density (Tapping Density) (g/cm$^3$):

A predetermined amount (6.0 g) of sample was weighed and placed in a 15-mmφ cell for measurement, which was set in a tapping apparatus. At a falling height of 45 mm and a tapping speed of 2 second/time, the sample was freely fallen 400 times. Thereafter, the volume of the sample was measured. From the relationship between the volume and mass, the bulk density of the sample was calculated.

Figure 4:
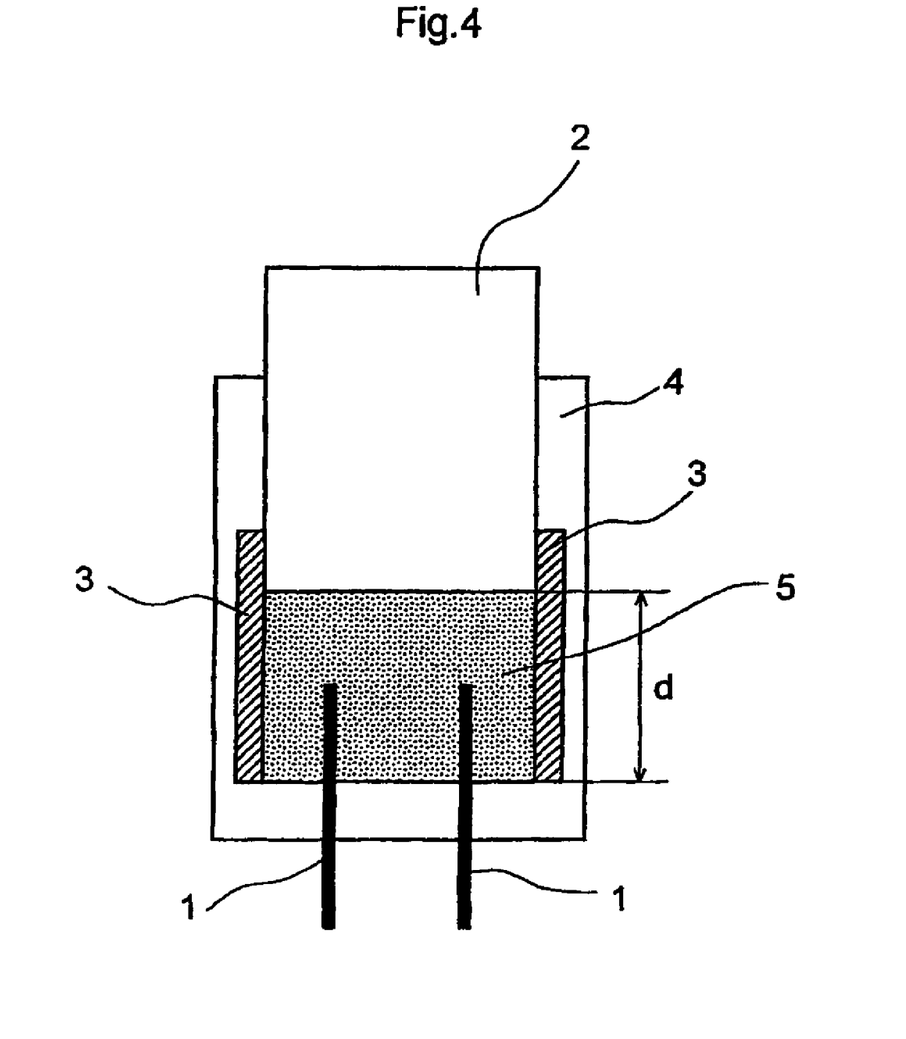
FIG. 4 is a schematic longitudinal cross-section showing a cell for the measurement of compressed specific resistance of the carbon fiber of the present invention.

4) Compressed Specific Resistance (Ω·cm):

Sample to be measured was placed in a resin cell 4 as shown in FIG. 4 and pressed by compression rods 2 from above and below and current was applied at a constant pressure. Then the voltage between terminals for the measurement of voltage placed at a midpoint of the sample was read and specific resistance was calculated from the cross sectional area of the vessel and the distance between the voltage terminals. The specific resistance varied depending on the pressing conditions and it showed a higher resistance at a lower pressure whereas as the pressure is further increased above a certain pressure, it showed a substantially constant value regardless of the pressing conditions. In the present invention, the value obtained when the sample was compacted to a bulk density of 0.8 g/cm$^3$ by the following operation was defined as volume specific resistance (compressed specific resistance).

That is, a predetermined amount of sample was placed in a cell 4 for the measurement of compressed specific resistance made of a resin having a planar area of 1×4 cm$^2$ and a depth of 10 cm, provided with a copper plate current terminal 3 for applying current to an object 5 to be measured and with a voltage measuring terminals 1 at a midpoint, and the sample was increasingly compressed by the compression rod 2 from above and while measuring the compression a current of 0.1 A was applied thereto. When the bulk density of 0.8 g/cm$^3$ was reached, the voltage (E) V between the two terminals 1 for the measurement of voltage at a distance of 2.0 cm therebetween inserted through the bottom of the vessel was read. Specific resistance (R) (Ω·cm) was calculated according to the following formula.

$$R(\Omega \cdot cm) = (E/0.1) \times D(cm^2)/2(cm)$$

In the above formula, D represents a cross sectional area (depth×width) of powder in the direction of current=10d.

5) Surface Resistivity of Coating Film (Ω/□):

A coating film was prepared and measured according to 4-terminal method in compliance with "JIS K7194" by use of Lotest Hp MCP-T410 manufactured by Mitsubishi Chemical, Inc.

6) Specific Resistance of Paste (Ω·cm):

A paste film sample having a film thickness of 25 μm was prepared by use of a doctor blade and the surface resistivity of the sample was measured according to 5) above. The obtained value was divided by the film thickness to obtain specific resistance of the paste.

7) Transmittance (%):

This was measured by integrating-sphere light transmittance method in compliance with "JIS K7105" by use of NDH-1001 DP manufactured by Nippon Denshoku Industries Co., Ltd.

EXAMPLE 1

In accordance with the description in Japanese Patent No. 2778434, vapor grown carbon fiber was produced through a production process in which ferrocene (7 mass %) was dissolved in benzene, and droplets of the resultant solution were sprayed onto a furnace wall, to thereby cause thermal decomposition of the solution. The thus-produced carbon fiber was heated at 1,200° C. in an argon atmosphere, and further heated at 2,800° C. in an argon atmosphere. After heat treatment was completed, the resultant flocky carbon fiber was pulverized, to thereby yield vapor grown carbon fiber having an outer diameter of 0.1–0.2 μm, a length of 10–20 μm, and an aspect ratio of 50–200. Through observation by use of a transmission electron microscope (TEM), the carbon fiber was found to contain branched carbon fiber in an amount of 22 mass %. The bulk density (tapping density) of the carbon fiber was 0.035 g/cm$^3$. After the carbon fiber was compressed so as to attain a bulk density of 0.8 g/cm$^3$, the resultant carbon fiber had a compressed specific resistance (powder resistance) of 0.018 Ω·cm. The carbon fiber (40 mass %) was mixed with polyurethane, to thereby prepare a paste. The specific resistance of the paste was 0.25 Ω·cm. The results are shown in Table 1. FIG. 1 shows a photomicrograph (magnification: ×100,000) of a branched portion of the carbon fiber.

EXAMPLE 2

Figure 3:
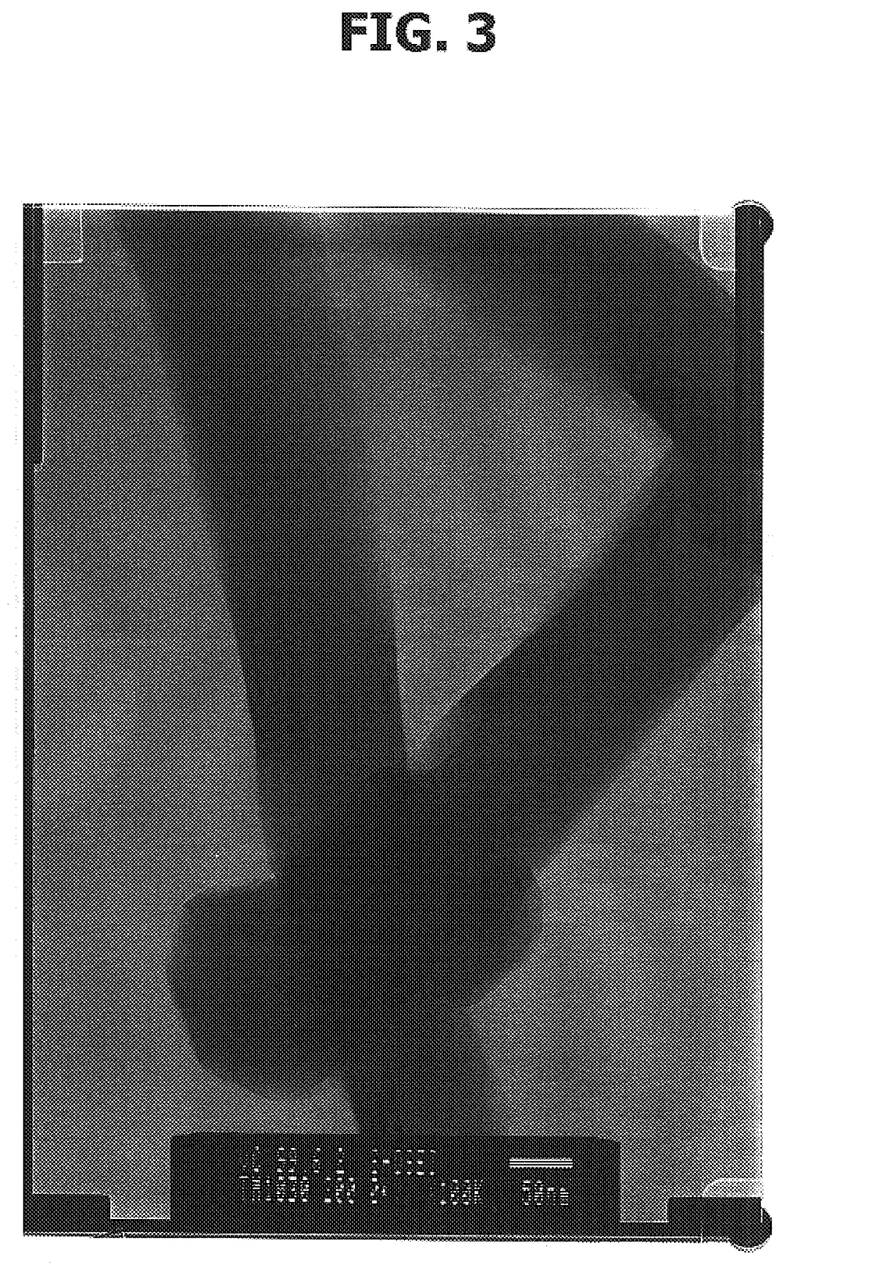
FIG. 3 shows a photomicrograph of the conventional branched vapor-grown carbon fiber as obtained by use of a transmission electron microscope (magnification: ×100,000).

Boron carbide (B$_4$C) powder (4 mass %) was added to vapor grown carbon fiber containing branched carbon fiber produced in a manner similar to that of Example 1, and uniform mixing was carried out. The resultant mixture was placed in a graphitic crucible, compressed, and then heated at 2,700° C. in an argon atmosphere for 60 minutes. The resultant product was pulverized, to thereby yield boron-containing vapor grown carbon fiber containing branched carbon fiber. The boron content of the carbon fiber was 1.8 mass %. In a manner similar to that of Example 1, the bulk density and compressed powder specific resistance of the carbon fiber, and the specific resistance of a resin paste containing the fiber were measured. The bulk density (tapping density) was 0.036 g/cm$^3$; the compressed powder specific resistance was 0.005 Ω·cm; and the specific resistance of the resin paste was 0.08 Ω·cm. The results are shown in Table 1. Further, FIG. 2 shows a photomicrograph thereby produce vapor grown carbon fiber (outer diameter: 0.1–0.2 µm, length: 5–10 µm). Through observation by use of a TEM, the carbon fiber was found to contain branched carbon fiber in an amount of 5 mass %. In a manner similar to that of Example 1, the bulk density and compressed powder specific resistance of the carbon fiber, and the specific resistance of a resin paste containing the fiber were measured. The results are shown in Table 1. FIG. 3 shows a photomicrograph of a branched portion of the carbon fiber.

TABLE 1

|  |  | Carbon fiber (µm) | | Branched carbon fiber content | Boron content | Bulk density (g/cm$^3$) | Compressed specific resistance (Ω · cm) | Specific resistance of paste (Ω · cm) |
| --- | --- | --- | --- | --- | --- | --- | --- | --- |
|  |  | Outer diameter | Length |  |  |  |  |  |
| Example | 1 | 0.1–0.2 | 10–20 | 22 | 0 | 0.035 | 0.018 | 0.25 |
|  | 2 | 0.1–0.2 | 10–20 | 22 | 1.8 | 0.036 | 0.005 | 0.08 |
|  | 3 | 0.1–0.2 | 10–20 | 22 | 0.5 | 0.035 | 0.005 | 0.09 |
|  | 4 | 0.1–0.2 | 10–20 | 22 | 0.2 | 0.036 | 0.005 | 0.08 |
| Comparative | 1 | 0.1–0.2 | 10–20 | 0 | 0 | 0.035 | 0.022 | 0.45 |
| Example | 2 | 0.1–0.2 | 5–10 | 5 | 0 | 0.035 | 0.021 | 0.38 |

Note: each content is represented by mass %.

(magnification: ×100,000) of a branched portion of the carbon fiber. The state was observed in which a central hollow portion extends throughout the filament including a branched portion thereof.

EXAMPLES 3 AND 4

Boron carbide (B$_4$C) powder was added to vapor grown carbon fiber containing branched carbon fiber produced in a manner similar to that of Example 1, and uniform mixing was carried out. The resultant mixture was placed in a graphitic crucible, compressed, and then heated at 2,800–2,900° C. in an argon atmosphere for 60 minutes, to thereby yield boron-containing vapor grown carbon fiber containing branched carbon fiber. In Example 3, the boron content of the carbon fiber was 0.5 mass %, and in Example 4, the boron content of the carbon fiber was 0.2 mass %. In a manner similar to that of Example 1, the bulk density and compressed powder specific resistance of the carbon fiber, and the specific resistance of a resin paste containing the fiber were measured. The results are shown in Table 1 together with the boron content.

COMPARATIVE EXAMPLE 1

Vapor grown carbon fiber (outer diameter: 0.1–0.2 µm, length: 10–20 µm) was produced through, instead of the production process described in Example 1, a conventional production process in which a raw material was gasified and then fed into a furnace. Through observation by use of a TEM, the thus-produced carbon fiber was found to contain only a small amount of branched carbon fiber. In a manner similar to that of Example 1, the bulk density and compressed powder specific resistance of the carbon fiber, and the specific resistance of a resin paste containing the fiber were measured. The results are shown in Table 1.

COMPARATIVE EXAMPLE 2

The procedure of Example 1 was repeated, except that the amount of ferrocene added was reduced to 2 mass %, to As shown in Table 1, the branched vapor-grown carbon fiber of the present invention (Examples 1 through 4) has a compressed powder specific resistance of 0.02 Ω·cm or less, which is lower than that of the conventional vapor grown carbon fiber (Comparative Examples 1 and 2). Therefore, the specific resistance of a resin paste containing the present branched vapor-grown carbon fiber is low; i.e., 0.3 Ω·cm or less. In contrast, the conventional vapor grown carbon fiber (Comparative Examples 1 and 2) has a compressed powder specific resistance of higher than 0.02 Ω·cm. Since the present branched vapor-grown carbon fiber containing boron has high crystallinity, its compressed powder specific resistance is further reduced.

Furthermore, as shown in the photomicrographs (magnification: ×100,000) in FIGS. 1 and 2 as obtained by use of a transmission electron microscope, in the present branched vapor-grown carbon fiber of the present invention, an individual fiber filament does not have nodules on a branched portion thereof, and a central hollow portion extends throughout the filament including the branched portion.

EXAMPLE 5

In the same manner as in Example 1, vapor grown carbon fiber having an average outer diameter of 0.04 µm, an aspect ratio of about 40, and a compressed specific resistance of 0.015 Ω·cm was obtained. From observations by use of a transmission electron microscope (TEM), it was confirmed that the carbon fiber contained 15 mass % of branched carbon fiber filaments.

0.5 mass part of the carbon fiber was added to a resin solution containing a polyester resin (4.5 mass parts) and methyl ethyl ketone (MEK) (95 mass parts), and the carbon fiber was dispersed in the solution by use of a paint shaker, to thereby yield an electrically conductive transparent composition. The composition was applied onto a glass plate by use of a spin-coater so as to attain a film thickness of 0.1 µm, and then dried at 150° C. for 1.5 hours. The transmittance at 600 nm and surface resistivity of the resultant coating were measured. The surface resistivity and transmittance of the coating were 2,000 Ω/□ and 80%, respectively.

EXAMPLE 6

In a manner similar to that of Example 5, a coating was formed by use of the same vapor grown carbon fiber as in Example 5; i.e., vapor grown carbon fiber having an average outer diameter of 0.04 μm, an aspect ratio of about 40, and a compressed specific resistance of 0.015 Ω·cm (0.25 mass parts) and carbon black (Ketjen Black EC, product of AKZO) (0.25 mass parts). The surface resistivity and transmittance of the coating were 1,500 Ω/□ and 75%, respectively.

EXAMPLE 7

The same vapor grown carbon fiber as in Example 5; i.e., vapor grown carbon fiber having an average outer diameter of 0.04 μm and an aspect ratio of about 40 was mixed with 4 mass parts of boron carbide ($B_4C$), and the resultant mixture was subjected to heat treatment at 2,800° C. in an atmosphere of inert gas. After heat treatment was completed, the boron content of the carbon fiber was 1.8 mass %, the compressed specific resistance of the carbon fiber was 0.008 Ω·cm, and the interlayer distance $d_{002}$ was 0.3375 nm. In a manner similar to that of Example 5, a coating was formed by use of 0.5 mass part of the resultant vapor grown carbon fiber. The surface resistivity and transmittance of the coating were 1,500 Ω/□ and 80%, respectively.

EXAMPLE 8

The vapor grown carbon fiber obtained in the same manner as in Example 1; i.e., vapor grown carbon fiber having an outer diameter of 0.08 μm, an aspect ratio of about 40, and a compressed specific resistance of 0.015 Ω·cm was treated at 35° C. in a fluorine ($F_2$) atmosphere. In a manner similar to that of Example 5, a coating was formed by use of the resultant vapor grown carbon fiber. The surface resistivity and transmittance of the coating were 2,000 Ω/□ and 90%, respectively.

EXAMPLE 9

Vapor grown carbon fiber having an outer diameter of 0.08 μm, an aspect ratio of about 40, and a compressed specific resistance of 0.018 Ω·cm was activated with carbon dioxide gas, to thereby yield activated carbon fiber having a specific surface area of 2,000 m²/g. The carbon fiber was immersed in 10% sulfuric acid for one hour, and then washed with water. Subsequently, the resultant carbon fiber was added to a sodium aluminate solution, to thereby form an alumina film (25 mass %) on the surface of the carbon fiber. In a manner similar to that of Example 5, a coating was formed by use of the resultant vapor grown carbon fiber. The surface resistivity and transmittance of the coating were 4,000 Ω/□ and 95%, respectively.

COMPARATIVE EXAMPLE 3

In a manner similar to that of Example 5, a coating was formed by use of the vapor grown carbon fiber obtained in the same manner as in Example 1; i.e., vapor grown carbon fiber having an outer diameter of 0.5 μm, an aspect ratio of about 40, and a compressed specific resistance of 0.022 Ω·cm. The surface resistivity and transmittance of the coating were 2,500 Ω/□ and 35%, respectively.

COMPARATIVE EXAMPLE 4

In a manner similar to that of Example 5, a coating was formed by use of carbon black (Ketjen Black EC, product of AKZO) having a BET specific surface area of 1,270 m²/g. The surface resistivity and transmittance of the coating were 3,000 Ω/□ and 10%, respectively.

INDUSTRIAL APPLICABILITY

The vapor grown carbon fiber containing branched carbon fiber of the present invention has a very small outer diameter, each fiber filament having a hollow cylindrical structure in which a central hollow portion extends throughout the filament including a branched portion thereof, which carbon fiber has high electrical conductivity and heat conductivity. Therefore, when the carbon fiber is added to a material such as resin or rubber or to electrodes of various batteries, the carbon fiber filaments are dispersed so as to form a network structure, to thereby enhance electrical conductivity and heat conductivity of such a material. In addition, since the present carbon fiber has a diameter smaller than that of conventional carbon fiber, even when the present carbon fiber is incorporated into a resin in a relatively large amount, transparency inherent to the resin can be maintained, and a transparent coating, film, or sheet of high electrical conductivity can be formed from the resin.

The electrically conductive composition of the present invention does not lose transparency inherent to a resin and exhibits excellent electrical conductivity. In general, an electrically conductive composition containing carbon powder or conventional carbon fiber has low transparency. In contrast, the electrically conductive composition of the present invention has both high electrical conductivity and high transparency, since transparency of the resin is barely lowered even when the amount of carbon fiber incorporated.

The invention claimed is:

1. Branched vapor-grown carbon fiber which has a hollow cylindrical structure and a compressed specific resistance of 0.018 Ω·cm or less, each fiber filament having a structure such that a central hollow portion extends throughout the filament including a branched portion thereof.

2. Branched vapor-grown carbon fiber as claimed in claim 1, which has an outer diameter of 0.05–0.5 μm, a length of 1–100 μm, and an aspect ratio of 10–2,000.

3. Branched vapor-grown carbon fiber as claimed in claim 1, which has an outer diameter of 0.002–0.05 μm, a length of 0.5–50 μm, and an aspect ratio of 10–25,000.

4. Branched vapor-grown carbon fiber as claimed in claim 1, which comprises, in an amount of at least 10 mass %, branched carbon fiber, each fiber filament having a structure such that a central hollow portion extends throughout the filament including a branched portion thereof.

5. Branched vapor-grown carbon fiber as claimed in claim 1, which further comprises boron.

6. Branched vapor-grown carbon fiber as claimed in claim 5, which comprises boron in an amount of 0.01–5 mass %.

7. Branched vapor-grown carbon fiber as claimed in claim 1, which has a heat conductivity of at least 100 kcal(mh° C.)$^{-1}$.

8. Branched vapor-grown carbon fiber as claimed in claim 7, which has a heat conductivity of at least 100 kcal (mh° C.)$^{-1}$ when the fiber is compressed so as to attain a bulk density of 0.8 g/cm³.

9. A process for producing branched vapor grown carbon fiber as claimed in claim 1 by thermal decomposition of an organic compound with a transition metal catalyst, characterized by spraying droplets of organic compound containing 5–10 mass % of a transition metal element or its compound on a heating furnace wall to allow reaction to form carbon fiber filaments on the furnace wall, burning the recovered filaments at 800 1,500° C. in a non-oxidative atmosphere, and heating them at 2,000–3,000° C. to perform graphitization treatment in a non-oxidative atmosphere.

10. The process as claimed in claim 9, wherein the heating for graphitization treatment is performed after doping with boron or at least one boron compound selected from the group consisting of boron oxide, boron carbide, boric ester, boric acid or its salt, and organic boron compounds as a crystallization promotion compound in an amount of 0.1–5 mass % in terms of boron.

11. An electrically conductive transparent composition comprising a resin binder and carbon fiber incorporated into the binder, characterized by having transparency and comprising branched vapor grown carbon fiber having an outer diameter of 0.01–0.1 μm, an aspect ratio of 10–15,000, and a compressed specific resistance of 0.02 Ω·cm or less, wherein the blending amount of the vapor grown carbon fiber is from 5 to 40 mass % of the total composition.

12. The electrically conductive transparent composition as claimed in claim 11, wherein the carbon fiber is vapor grown carbon fiber having an outer diameter of 0.05–0.1 μm or less, a length of 1–100 μm, and an aspect ratio of 10–2,000, each fiber filament having a hollow cylindrical structure.

13. The electrically conductive transparent composition as claimed in claim 11, which has a surface resistivity of 10,000 Ω/□ or less.

14. The electrically conductive transparent composition as claimed in claim 11, which has a surface resistivity of 5–10,000 Ω/□, and a transmittance of at least 60% when the composition is formed to have a thickness of 0.5 μm.

15. The electrically conductive transparent composition as claimed in claim 11, wherein the carbon fiber is vapor grown carbon fiber having an interlayer distance ($d_{002}$) of carbon crystal layers of 0.339 nm or less and a compressed specific resistance of 0.018 Ω·cm or less.

16. The electrically conductive transparent composition as claimed in claim 11, wherein the branched vapor grown carbon fiber has a compressed specific resistance of 0.018 Ω·cm or less, each fiber filament thereof having a structure such that a central hollow portion extends throughout the filament including a branched portion thereof.

17. The electrically conductive transparent composition as 10 claimed in claim 16, wherein the carbon fiber comprises, in an amount of at least 10 mass %, branched vapor-grown carbon fiber, each fiber filament having a structure in which a central hollow portion extends throughout the filament including a branched portion thereof.

18. The electrically conductive transparent composition as claimed in claim 11, wherein the vapor grown carbon fiber comprises boron or a combination of boron and nitrogen in an amount of 0.0 1–3 mass %.

19. The electrically conductive transparent composition as claimed in claim 11, wherein the vapor grown carbon fiber comprises fluorine in an amount of 0.001–0.05 mass %.

20. The electrically conductive transparent composition as claimed in claim 11, wherein the vapor grown carbon fiber is coated with 20–70 mass % aluminum oxide.

21. The electrically conductive transparent composition as claimed in claim 11, which comprises carbon black together with the vapor grown carbon fiber.

22. An electrically conductive transparent material formed from an electrically conductive transparent composition according to claim 11.

23. The electrically conductive transparent material as claimed in claim 22, which assumes a form of coating, film produced through spraying, film, or sheet.

* * * * *